April 16, 1968      J. V. MILO      3,378,021
SAFETY SHUT-OFF VALVE
Filed Sept. 16, 1963      2 Sheets-Sheet 1
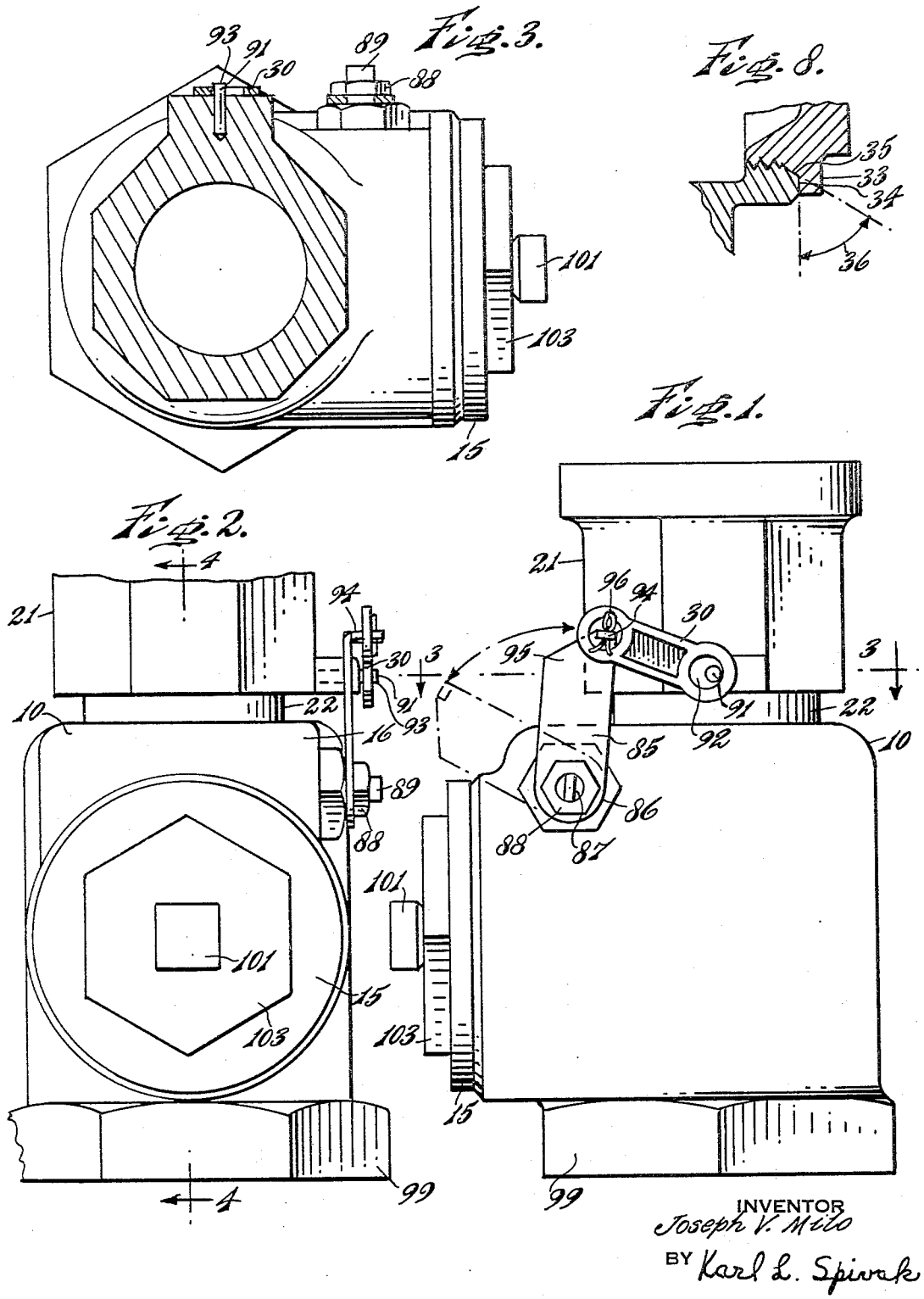
INVENTOR
Joseph V. Milo
BY Karl L. Spivak
ATTORNEY

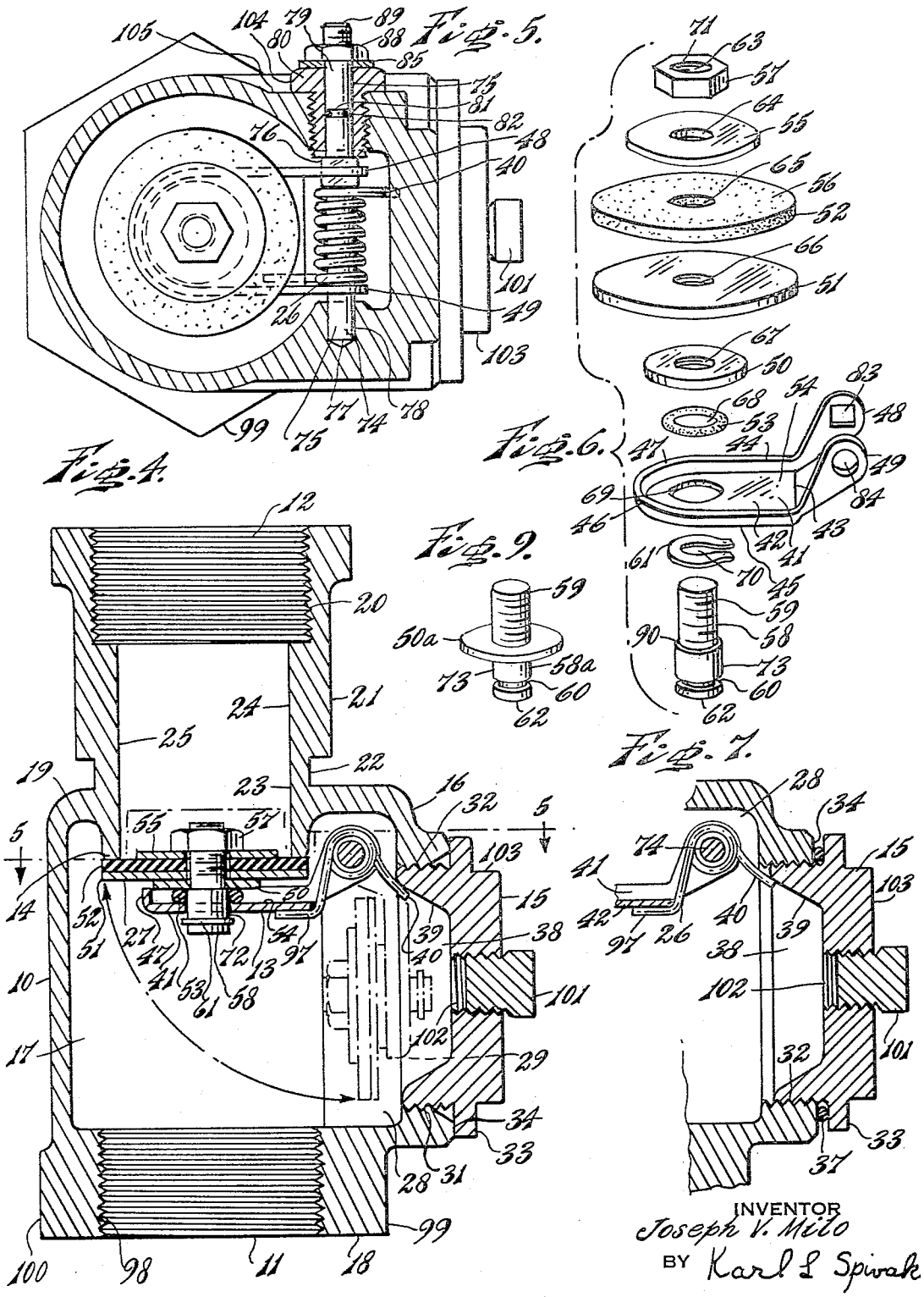

United States Patent Office 3,378,021
Patented Apr. 16, 1968

3,378,021
SAFETY SHUT-OFF VALVE
Joseph V. Milo, 407 South St.,
Elizabeth, N.J. 07202
Filed Sept. 16, 1963, Ser. No. 309,220
2 Claims. (Cl. 137—68)

This invention relates to safety shut-off valves for use in gasoline dispensing stations and more particularly to a type of valve offering protection against serious gasoline fires due to either shearing the dispensing unit, impact upon the dispensing unit or by exposure fires.

Gasoline is one of the most dangerous flammable liquids presently in general use, having a flash point of minus fifty degrees Fahrenheit. Due to this extremely low flash point, flammable vapors, and therefore potentially explosive conditions can be created throughout the entire range of temperatures normally encountered in the civilized portions of the world. Despite its properties creating flammable and explosive potential, gasoline has found wide-spread use as a fuel for motor vehicles, particularly private automobiles. It is this end use that requires large quantities of the flammable liquid to be stored and dispensed in populated areas. It is thus seen that places of greater population density will have more automobiles, which in turn will consume more gasoline, which then will require greater storage facilities thereby multiplying the effect of the hazard created by the gasoline.

In view of its popularity and the fact that gasoline is frequently stored in congested areas, certain safety precautions have generally been adopted in the industry. In most instances, product is stored in underground tanks of approved construction, properly vented and protected from injury for maximum safety. The product is then pumped from the underground storage to remote dispensing units at multiple pedestal installations. It is where the gasoline piping rises above ground to the dispensing units there lies the greatest area of danger and it is this location the instant invention seeks to protect.

Devices presently in use are of the three alarm emergency valve type, that is a single disc valve that responds instantly to fire and impact emergencies. In the usual valve, a fusible link connects a trip arm to valve body to automatically and safely snap valve shut in the event of an exposure fire, thus keeping more gasoline from escaping. Should the dispenser be slightly bumped, a sensitive, spring-loaded latch automatically releases a trip arm, allowing valve to close tightly thereby preventing leaking in the emergency. Should the dispenser be entirely overturned, a machined shear section of weakened cross section is designed to break allowing valve to close and keeping gasoline from flowing into the area to cause further loss and additional hazard.

Most devices presently in use suffer from common deficiencies in that the valve closure frequently fails thus permitting leakage at times when no leakage is desired. Further, access to the valve interior is limited or nonexistent thus making servicing or adjustment a matter of considerable inconvenience.

It is therefore an object of this invention to provide a safety shut-off valve providing novel seal disc seating means.

It is another object of this invention to provide a safety shut-off valve wherein a full access opening to valve interior has been furnished.

It is another object of this invention to provide a safety shut-off valve wherein a pressure testing plug is incorporated in access cover.

It is another object of this invention to provide poppet torsion spring adjustment means within a safety shut-off valve.

It is another object of this invention to provide a safety shut-off valve including improved fusible link friction retaining means.

It is another object of this invention to provide a safety shut-off valve arrangement at dispensing devices that will permit operation of other dispensers while one is inoperative.

It is another object of this invention to provide a safety shut-off valve that may be manually closed and controlled when desired.

It is another object of this invention to provide a safety shut-off valve that may be readily repaired or reset without the necessity of removing valve from the line.

It is another object of this invention to provide a safety shut-off valve that is relatively inexpensive in manufacture, simple in installation and trouble free upon operation.

Other objects and a fuller understanding of the invention will be had by referring to the following description and claims of a preferred embodiment thereof, taken in conjunction with the accompanying drawings wherein like reference characters refer to similar parts throughout the several views and in which:

FIG. 1 is a side elevational view of a device constructed in accordance with the instant invention.

FIG. 2 is a rear elevational view of the safety shut-off valve.

FIG. 3 is a cross section taken along line 3—3 of FIG. 1.

FIG. 4 is a cross section taken along line 4—4 of FIG. 2.

FIG. 5 is a cross section taken along line 5—5 of FIG. 4.

FIG. 6 is an exploded detail view of poppet assembly.

FIG. 7 is an enlarged partial cross section of service opening.

FIG. 8 is an enlarged partial cross section of cover seat.

FIG. 9 is a perspective view of modified stem construction.

Although specific terms are used in the following description for the sake of clarity, these terms are intended to refer only to the particular structure of my invention selected for illustration in the drawings and are not intended to define or limit the scope of the invention.

The device as best seen in FIG. 4 comprises a generally hollow valve body 10 having bottom inlet 11 and top outlet 12 axially aligned for non-turbulent flow of gasoline from tank (not shown) to dispenser (also not shown) and provided with spring biased poppet assembly 13 closing upon valve seat 14. Removable cover 15 turns into rear 16 of valve body 10 providing access to valve interior 17 and poppet assembly 13 without disconnecting valve from piping.

Valve body 10 may be of cast iron of $\frac{3}{16}$-inch minimum thickness having generally cylindrical configuration terminating at valve bottom 18 in a threaded inlet 11 for connection to suction piping (not shown) and at valve top 19 in an outlet 23 for connection to shear section 21. Top outlet 12 may be tapped with an internal thread 20 or may terminate in a Dresser end, a union end, or a flanged end if so desired and as required to connect valve with dispensing piping. Shear section 21 contains top outlet 12 and frangibly connects to and extends above valve top 19 through rectangular shear area 22 of reduced cross section providing a weakened joint designed to fracture upon impact. Shear section interior 24 is cylindrical in configuration with the center of cylindrical valve body providing a continuous, straight conduit 25 from bottom to top for passage of gasoline.

Circular valve seat 14 depends from valve top 19 providing horizontal seating surface mating with poppet assembly 13 when torsion spring 26 biases poppet assembly to closed position 27. Valve seat 14 extends full circumferential periphery of conduit 25 permitting positive closure of valve upon operation of poppet assembly and allowing full flow of product without construction during normal operation.

Reserve chamber 28 communicates with and extends rearwardly from valve interior 17 furnishing repose area for poppet assembly 13 entirely removed from stream of flow through conduit 25 when in open position 29. Fusible link 30 restrains poppet assembly in open position 29 against urging of torsion spring 26 as hereinafter more fully described. Reserve chamber terminates rearwardly in a circular threaded opening 31 larger in diameter than poppet assembly thereby permitting easy access to valve interior 17. Circular cover 15, threaded at interior end 32 screws into circular opening 31 a minimum of four full turns for adequate strength. Circular flange 33 projects beyond threaded end 32 a distance sufficient to seat upon rear vertical surface 34 upon turning cover 15 into opening 31.

As shown in FIG. 8, machined circular cut 35 on angle 36 extends rearwardly from surface 34 approximately ¾₆-inch thereby reducing vertical, circular extension of said surface to approximately ⅟₁₆-inch providing a metal to metal seat with flange 33 when cover 15 is fully turned into threaded opening 31.

As an alternate means of construction and as seen in FIG. 7, seal between cover 15 and opening 31 may be accomplished through the use of a gasoline resistant O-ring 37 of any well-known design. O-ring must be of diameter to fit tightly over interior end 32 of cover forming seal between surface 34 and flange 33 when cover is fully turned into threaded opening 31.

Cover 15 may be provided interiorly with circular, recessed area 38 having inclined sidewalls 39 in the interest of saving material and weight and also to provide adequate space to permit poppet assembly 13 to swing clear of stream of flow through conduit 25 when in open position 29. Further, one end 40 of spring 26 seats against sidewall 39 thus permitting ready adjustment of spring torsion simply by turning cover 15 in threaded opening 31, the torsion increasing as cover is turned into the opening. It is apparent then that O-ring 37 may have to be adjusted in cross sectional area as required to accommodate the desired spring torsion.

Referring now to FIG. 6, poppet assembly 13 comprises a metallic carrier 41 furnishing a horizontal body 42 of generally rectangular shape having three straight sides 43, 44, 45 and one circular side 46 joining sides 44, 45. Continuous flange 47 extends upward from and at right angles to sides 44, 45, 46 terminating rearwardly in a pair of operating lugs 48, 49 bent at an angle above said flange. Circular side 46 is cut to a radius sufficient to contain circular bottom washer 50 without binding permitting great flexibility of backup disc 51 and seal disc 52 about O-ring 53 in contact with top 54 of carrier body 42. Bottom washer 50 is provided between O-ring 53 and backup disc 51 while top washer 55 protects top 56 of seal disc 52 when hex nut 57 is turned upon threaded stem 58.

Stem 58 may be of cylindrical brass or bronze with threaded top 59, unthreaded barrel 73 and provided with a circumferential recess 60 near bottom 62 to receive spring retaining clip 61 and shoulder 90 forming stop for bottom washer 50 when nut 57 is turned. Axially aligned circular openings 63, 64, 65, 66, 67, 68, 69, 70 provided in respective poppet assembly components permit stem 58 to be drifted upwardly through each respective member with internal threads 71 of hex nut 57 mating with external threads 59 of stem to tie the assembly together as a unit. Sufficient turns are taken up by nut 57 for adequate strength in operation at the same time leaving adjusting space 72 to assure fluid-tight seating of seal disc 52 against valve seat 14 at all times upon operation. Stem 58a and bottom washer 50a may be integrally turned from a single piece of stock if desired so that top washer 55, seal disc 52, back up disc 51, and combined stem 58a and washer 50a may be joined as a single cooperating structure upon taking up nut 57 on threads 59. Top washer 55 must be smaller in diameter than seal disc 52 and of such size as to fit entirely within conduit 25 without touching to allow positive seating under all conditions of operation. Both seal disc 52 and O-ring 53 are constructed of resilient material impervious to gasoline; Garlock #8990 or equal is suitable for this purpose. By providing space 72, adequate freedom of action is introduced allowing seal disc 52 to pivot upon O-ring 53 universally in all directions thereby assuring a positive seat between disc 52 and seat 14 upon the poppet assembly 13 being urged to closed position 27 by torsion spring 26.

Guide shaft 74 extends horizontally across valve rear section 16 through reserve chamber 28 furnishing both cylindrical sections 75 and rectangular sections 76 integrally fabricated from one-quarter inch brass square bar stock. Cylindrical end 77 of shaft 74 turns in circular hole 78 drilled in valve body and communicating with reserve chamber 28. Trip arm end 79 is journalled in externally threaded bushing 80 which in turn is threadedly engaged through valve wall to reserve chamber 28. Bushing head 104 provides a metal to metal seat against valve body exterior 105. Annular recess 81 on cylindrical section 75 within bushing 80 retains O-ring 82 of gasoline impervious, resilient material providing shaft sealing means. Carrier lugs 48, 49 are provided respectively with a rectangular opening 83 and a circular opening 84 corresponding to rectangular section 76 and cylindrical section 75 of guide shaft 74. It is thus seen that when guide shaft 74 is drifted through openings 83, 84 of lugs 48, 49, the respective rectangular portions will key together thus imparting any rotating motion on the part of guide shaft 74 to carrier 41 and thence to poppet assembly 13. Trip arm 85 is provided near shaft end 86 with a rectangular opening 87 corresponding with and fitted over rectangular section 76 exteriorly from valve body 10 thereby imparting rotative motion to shaft 74. Brass nut 88 threadedly engaged upon external end 89 of shaft 74 locks trip arm 85 in position for ready operation.

As shown in FIGS. 1, 2 and 3, trip mechanism assembly comprises a standard U.L. approved fusible link 30 contacting pin 91 tangentially in such a manner that contact will be broken upon impact by link eye 92 sliding over head 93. Pin 91 projects into metal sidewall of shear section 21 above shear area 22 in order that fusible link-pin contact will be immediately lost should shear section 21 be disconnected from valve body 10. Trip arm 85 rotates guide shaft 74 as hereinbefore described and pivotally joins fusible link 30 through lug 94 bent at link end 95 at right angles to trip arm 85. Standard cotter pin 96 secures lug 94 to fusible link 30 in the usual manner.

Torsion spring 26 coils upon guide shaft 74 and anchors one end 40 against cover 15 which may be adjustable as hereinbefore set forth. Second end 97 contacts body 42 of carrier 41 urging poppet assembly 13 to closed position 27 through torsion spring action. It is desirable for spring bias action to be strong so that valve may be quickly and positively closed in the event of emergency.

Bottom inlet 11 may be tapped with standard 1½ inch or two inch pipe threads 98 as required for usual threaded connection with suction piping (not shown). Hexagonal configuration 99 built into bottom 100 of valve body 10 provides convenient wrench location to securely turn valve upon piping providing a leak-free connection. Pressure test plug 101 removably fills threaded center opening 102 tapped in cover 15 extending through hexagonal wrench extension 103.

In operation, assembled valve is secured to suction piping in upright position in a leak-proof joint. Trip arm 85 is urged in a clockwise direction against bias of torsion spring 26 rotating guide shaft 74 until poppet assembly 13 reaches open position 29. Eye 92 of fusible link 30 may then be looped over head 93 of pin 91 locking poppet assembly in open position. Action of torsion spring 26 will provide sufficient force to maintain contact between eye of link and pin under all normal conditions of operation. It is thus seen, that should a fire occur, fusible link 30 will melt and poppet assembly will rotate to closed position 27 by action of torsion spring 26. Should pedestal (not shown) be struck a blow of sufficient magnitude to possibly damage the piping, the force of impact will cause eye 92 of link 30 to slide off of pin head 93 thereby causing valve to close. In the event of a blow severe enough to carry away shear section 21, position of pin 91 will also be disturbed causing valve to close.

Although I have described my invention with a certain degree of particularity, it is understood that the present disclosure has been made only by way of example and that numerous changes in the details of construction and the combination and arrangement of parts may be resorted to without departing from the spirit and scope of the invention as hereinafter claimed.

What is claimed is:
1. In a safety shut-off valve, the combination of
(A) a valve body providing a vertical, cylindrical, fluid conduit having a bottom inlet and a top outlet;
(B) a shear section frangibly mounted above the said conduit and forming an extension thereof exteriorly of the said valve body;
(C) a horizontal valve seat formed inside the said valve body adjacent to the said top outlet,
  (1) said seat being of circular configuration;
(D) a poppet assembly seating means pivotally arranged in the said valve body,
  (1) said means being pivoted to an open position and a closed position,
  (2) said means including a gasoline resistant seal disc,
    (a) said disc sealing the said seat when pivoted to the said closed position;
(E) the said valve body being provided with a rearwardly positioned, threaded opening,
  (1) the said opening being of sufficient size to permit the removal or insertion of the said poppet assembly therethrough;
(F) a cover threadedly engaged in and closing the said rearward, threaded opening;
(G) torsion spring means urging said poppet assembly seating means to the said closed position,
  (1) said spring terminating in two ends,
    (a) one of said ends engaging said poppet assembly seating means and
    (b) the second of said ends being restrained against a portion of the said cover,
      (1) said cover providing spring bias adjusting means, (a) said cover strengthening the spring bias when turned into the said threaded opening and said weakening said spring bias when turned out of the said threaded opening; and
(H) trip arm means affixed to the said shear section,
  (1) said means retaining the said poppet assembly seating means in the said open position against the bias of the said torsion spring.

2. In a safety shut-off valve, the combination of
(A) a valve body providing a vertical, cylindrical fluid conduit having a bottom inlet and a top outlet,
  (1) said valve body being provided with a rearwardly positioned, threaded opening;
(B) a shear section frangibly mounted above the said conduit and forming an extension thereof exteriorly of the said valve body;
(C) a horizontal valve seat formed inside the said valve body adjacent to the said top outlet,
  (1) said seat being of circular configuration;
(D) a poppet assembly seating means pivotally arranged in the said valve body,
  (1) said means being pivotal to an open position and a closed position,
  (2) said means including a gasoline resistant seal disc,
    (a) said disc sealing the said seat when pivoted to the said closed position;
  (3) said poppet assembly means comprising
    (a) a relatively flat carrier having a centrally positioned circular opening,
    (b) a cylindrical stem riding freely within said opening and perpendicular to the said carrier,
      (1) said stem having a threaded upper section and an unthreaded lower section, (a) said lower section being vertically movable in the said carrier opening,
    (c) the said seal disc being immovably secured to the said stem at the threaded section thereof and above the said carrier,
    (d) resilient base means interposed between the said carrier and the said seal disc,
      (1) said base means permitting the said seal disc to pivot relative to the said carrier,
      (2) the said base means comprising a gasoline resistant O-ring, said O-ring having a transverse diameter less than the diameter of the said seal disc,
(E) torsion spring means urging said poppet assembly seating means to the said closed position,
  (1) said spring terminating in two ends,
    (a) one of said ends engaging said poppet assembly seating means and
    (b) the second of said ends being restrained against a portion of the said valve body,
      (1) said valve body providing spring bias adjusting means;
(F) trip arm means affixed to the said shear section,
  (1) said means retaining the said poppet assembly seating means in the said open position against the bias of the said torsion spring; and
(G) a cover threadedly engaged in and closing the said rearward, threaded opening.

References Cited
UNITED STATES PATENTS

| | | | |
|---|---|---|---|
| 1,285,609 | 11/1918 | Bubb | 137—527 |
| 2,712,427 | 7/1955 | Welborn et al. | 251—86 X |
| 2,274,776 | 3/1942 | Cull | 251—298 X |
| 2,604,295 | 7/1952 | Robinson | 137—521 X |
| 2,965,116 | 12/1960 | Bonne et al. | 137—68 X |
| 3,173,439 | 3/1965 | Griswold et al. | 137—527.4 X |

WILLIAM F. O'DEA, *Primary Examiner.*

R. GERARD, *Assistant Examiner.*